United States Patent
Hsiao

(10) Patent No.: US 9,772,859 B2
(45) Date of Patent: Sep. 26, 2017

(54) WAKE-UP JUDGMENT APPARATUS FOR GENERATOR

(71) Applicant: DELTA ELECTRONICS, INC., Guishan Township (TW)

(72) Inventor: Chih-Hung Hsiao, Guishan Township (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 392 days.

(21) Appl. No.: 14/555,794

(22) Filed: Nov. 28, 2014

(65) Prior Publication Data

US 2016/0085562 A1    Mar. 24, 2016

(30) Foreign Application Priority Data

Sep. 19, 2014 (CN) .......................... 2014 1 0482384

(51) Int. Cl.
| | |
|---|---|
| G06F 1/00 | (2006.01) |
| G06F 9/44 | (2006.01) |
| G06F 1/32 | (2006.01) |
| F03D 7/00 | (2006.01) |
| F03D 9/25 | (2016.01) |
| H02J 3/38 | (2006.01) |
| H02J 7/00 | (2006.01) |
| H02J 3/46 | (2006.01) |
| H02J 7/04 | (2006.01) |

(52) U.S. Cl.
CPC .......... *G06F 9/4418* (2013.01); *G06F 1/3287* (2013.01); *G06F 1/3293* (2013.01); *F03D 7/00* (2013.01); *F03D 9/25* (2016.05); *H02J 3/386* (2013.01); *H02J 3/46* (2013.01); *H02J 7/0021* (2013.01); *H02J 7/0068* (2013.01); *H02J 7/045* (2013.01); *Y02B 60/186* (2013.01)

(58) Field of Classification Search
CPC .... G06F 1/3287; G06F 1/3293; G06F 9/4418; Y02B 60/186; F03D 9/25; F03D 7/00; H02J 3/386; H02J 7/0068; H02J 3/46; H02J 7/0021; H02J 7/045
See application file for complete search history.

(56) References Cited

U.S. PATENT DOCUMENTS

2010/0295305 A1* 11/2010 Mahawili .............. F03D 7/0244
　　　　　　　　　　　　　　　　　　　　　　　　　　　290/44
2011/0206955 A1*  8/2011 Hirai ................. H01M 10/3909
　　　　　　　　　　　　　　　　　　　　　　　　　　　429/50

(Continued)

*Primary Examiner* — Xuxing Chen
(74) *Attorney, Agent, or Firm* — Hauptman Ham, LLP

(57) ABSTRACT

A wake-up judgment apparatus for a generator includes a current sensing element and an electric charge processing element. A first terminal of the current sensing element is electrically connected to a power conversion circuit, and a second terminal thereof is electrically connected to an auxiliary micro power. The power conversion circuit provides power conversion and power transmission between the generator and a load, and the power conversion circuit is electrically connected to a main supply power. A first terminal of the electric charge processing element is electrically connected to a third terminal of the current sensing element, and a second terminal thereof is electrically connected to the auxiliary micro power, and a third terminal thereof is electrically connected to a microprocessor to output a wake-up signal to the microprocessor.

20 Claims, 3 Drawing Sheets

(56) References Cited

U.S. PATENT DOCUMENTS

2013/0054043 A1* 2/2013 Klodowski .......... G01R 31/343
    713/320
2015/0270715 A1* 9/2015 Park ..................... H02J 4/00
    307/84
2015/0277545 A1* 10/2015 Flowers ................ G06F 1/3296
    713/323

* cited by examiner

WAKE-UP JUDGMENT APPARATUS FOR GENERATOR

BACKGROUND

1. Technical Field

The present disclosure relates generally to a wake-up judgment apparatus for a generator, and more particularly to a wake-up judgment apparatus is provided to judge whether the microprocessor should be woken up or not according to operation conditions of the generation apparatus when the microprocessor is in a sleep state.

2. Description of Related Art

The regeneration energy is often coupled into electricity energy through a generator, and then the electricity energy is converter into a stable energy by a controller. The regeneration energies are generally provided by wind turbines, hydraulic engines, or human and animal powers. However, if the required power of the controller is supplied from the generator, the controller cannot control to convert the unstable energy into the stable energy when the generator is operated from a stationary condition to a momentary condition and vice versa. Accordingly, the controller needs to provide the real-time response and is continually supplied by the external power.

In addition, the problem caused by externally supplying power to the controller is that: the controller has to provide a short-circuit protection for the whole system when the controller is operated in a no-wind condition, a no-water flow condition, or an idle state for a long time, or the generator is operated in an over-energy condition. Therefore, the unnecessary consumed power is accumulated in the controller. It is assumed that the external power is a battery. When the no-energy operation is continued too long, the battery might be over discharged or damaged. In addition, the generated mechanical energy from the generator would damage the whole system or the controller once the external energy is suddenly occurred.

Accordingly, it is desirable to provide a wake-up judgment apparatus for the generator to only use an auxiliary micro power to implement the operation of waking up the microprocessor and reduce consumed power of operating the wake-up judgment apparatus.

SUMMARY

An object of the present disclosure is to provide a wake-up judgment apparatus for a generator to solve the above-mentioned problems. Accordingly, the wake-up judgment apparatus is installed between a generation apparatus and a microprocessor. The wake-up judgment apparatus is provided to judge whether the microprocessor should be woken up or not according to operation conditions of the generation apparatus when the microprocessor is in a sleep state. The wake-up judgment apparatus includes a current-sensing element and an electric charge processing element. The current-sensing element has a first terminal, a second terminal, and a third terminal. The first terminal is electrically connected to a power conversion circuit, and the second terminal is electrically connected to an auxiliary micro power. The power conversion circuit is configured to provide power conversion and power transmission between the generation apparatus and a load, and the power conversion circuit is electrically connected to a main supply power. The electric charge processing element has a first terminal, a second terminal, and a third terminal. The first terminal is electrically connected to the third terminal of the current-sensing element, the second terminal is electrically connected to the auxiliary micro power, and the third terminal is electrically connected to the microprocessor to output a wake-up signal to the microprocessor. The microprocessor is electrically connected to the auxiliary micro power, and an output power of the auxiliary micro power is much less than an output power of the main supply power.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Figure 1:
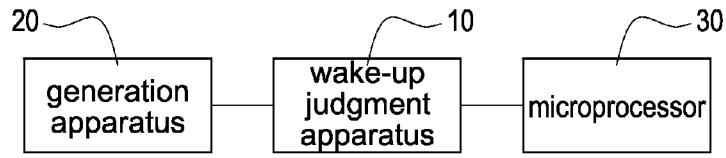
FIG. 1 is a circuit block diagram of a wake-up judgment apparatus for a generator according to a preferred embodiment of the present disclosure.

Reference will now be made to the drawing figures to describe the present invention in detail.

Reference is made to FIG. 1 which is a circuit block diagram of a wake-up judgment apparatus for a generator according to a preferred embodiment of the present disclosure. The wake-up judgment apparatus 10 is installed between a generation apparatus 20 and a microprocessor 30. The wake-up judgment apparatus 10 is used to detect operation conditions of the generation apparatus 20 which is driven by an external force. In addition, the wake-up judgment apparatus 10 is provided to judge whether the microprocessor 30 should be woken up or not according to operation conditions of the generation apparatus 20 when the microprocessor 30 is in a sleep state. In particular, the generation apparatus 20 is externally driven by wind power, hydraulic power, vapor power, or human power.

Figure 2A:
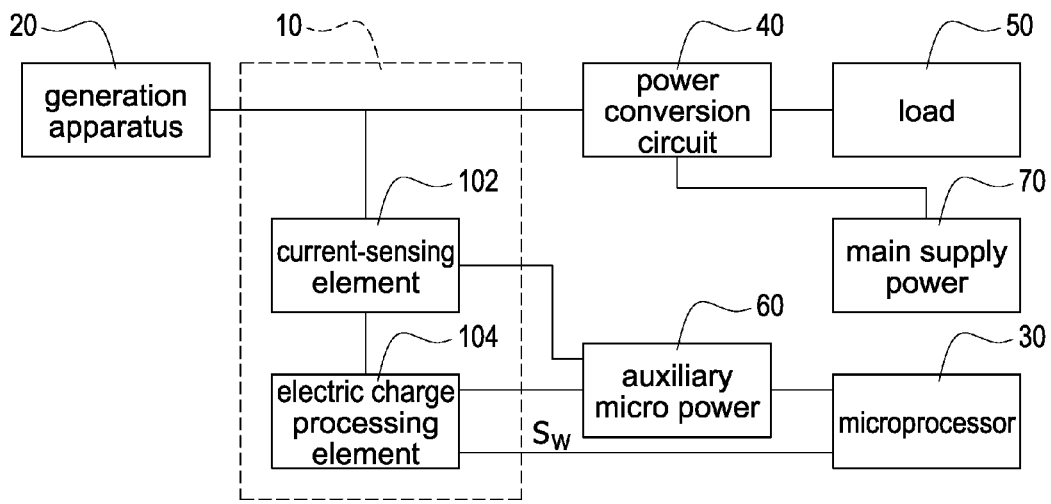
FIG. 2A is a circuit block diagram of the wake-up judgment apparatus for the generator according to a first embodiment of the preferred embodiment of the present disclosure.
Figure 2B:
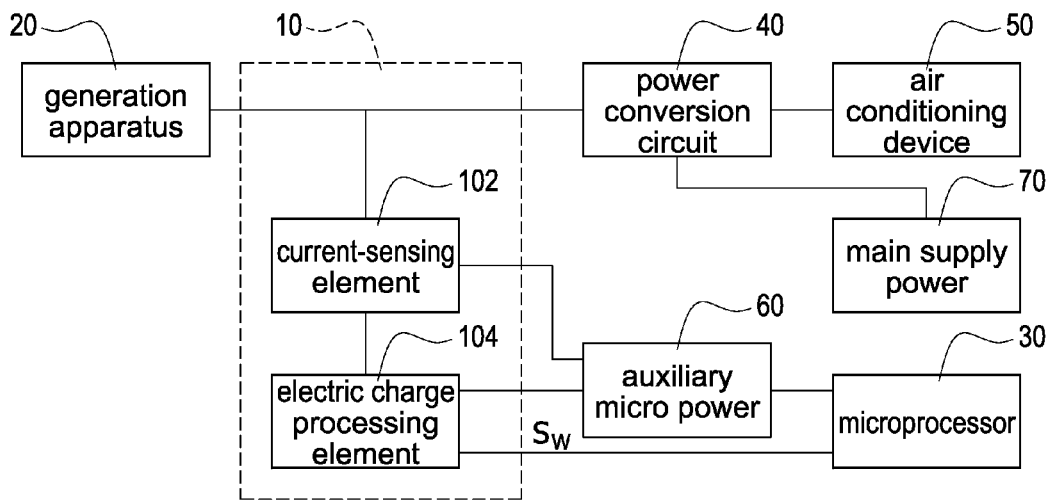
FIG. 2B is a circuit block diagram of the wake-up judgment apparatus for the generator according to a second embodiment of the preferred embodiment of the present disclosure.

In addition, reference is made to FIG. 2A which is a circuit block diagram of the wake-up judgment apparatus for the generator according to a first embodiment of the preferred embodiment of the present disclosure. The wake-up judgment apparatus 10 includes a current-sensing element 102 and an electric charge processing element 104. The current-sensing element 102 has a first terminal, a second terminal, and a third terminal. The first terminal of the current-sensing element 102 is electrically connected to a power conversion circuit 40. The power conversion circuit 40 is used to provide power conversion and power transmission between the generation apparatus 20 and a load 50. The second terminal of the current-sensing element 102 is electrically connected to an auxiliary micro power 60. The electric charge processing element 104 has a first terminal, a second terminal, and a third terminal. The first terminal of the electric charge processing element 104 is electrically connected to the third terminal of the current-sensing element 102. The second terminal of the electric charge processing element 104 is electrically connected to the auxiliary micro power 60. The third terminal of the electric charge processing element 104 is electrically connected to the microprocessor 30. The electric charge processing element 104 outputs a wake-up signal Sw to the microprocessor 30 via the third terminal thereof. In particular, the load 50 can be an air conditioning device, such as an air conditioner as shown in FIG. 2B.

As shown in FIG. 2A, the wake-up judgment apparatus 10 and the microprocessor 30 are electrically connected to the auxiliary micro power 60 to receive the required power supplied by the auxiliary micro power 60 so that the auxiliary micro power 60 is provided to supply power to the current-sensing element 102, the electric charge processing element 104, and the microprocessor 30. In addition, the power conversion circuit 40 is electrically connected to a main supply power 70 to receive the required power supplied by the main supply power 70 so that the main supply power 70 is provided to supply power to the power conversion circuit 40. Especially, an output power of the auxiliary micro power 60 is much less than an output power of the main supply power 70. In practical applications, the output power of the auxiliary micro power 60 is less than one tenth of the output power of the main supply power 70.

Figure 3:
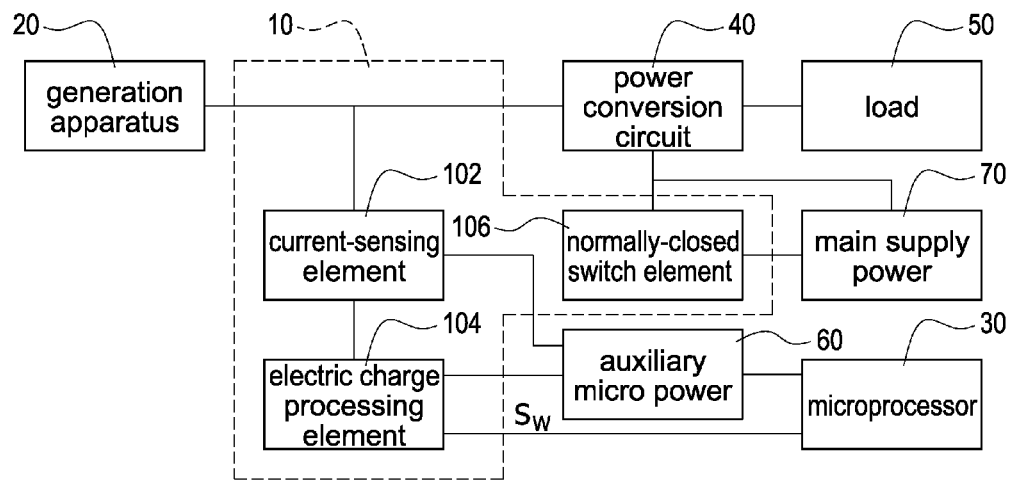
FIG. 3 is a circuit block diagram of the wake-up judgment apparatus for the generator according to a third embodiment of the preferred embodiment of the present disclosure.

In addition, reference is made to FIG. 3 which is a circuit block diagram of the wake-up judgment apparatus for the generator according to a third embodiment of the preferred embodiment of the present disclosure. The major difference between the second embodiment and the first embodiment as shown in FIG. 2A is that the wake-up judgment apparatus 10 further includes a normally-closed switch element 106. The normally-closed switch element 106 is electrically connected to the power conversion circuit 40 and the main supply power 70. Especially, for the power flow from the generation apparatus 20 to the load 50, a connection terminal to which the normally-closed switch element 106 and the power conversion circuit 40 are connected is closer to the load 50 than a connection terminal to which the current-sensing element 102 and the power conversion circuit 40 are connected. The normally-closed switch element 106 has a first terminal, a second terminal, and a third terminal. The first terminal of the normally-closed switch element 106 is electrically connected to the second terminal of the electric charge processing element 104. The second terminal of the normally-closed switch element 106 is electrically connected to the auxiliary micro power 60 so that the normally-closed switch element 106 is supplied by the auxiliary micro power 60. The third terminal of the normally-closed switch element 106 is electrically connected to the microprocessor 30 to judge whether the microprocessor 30 should be woken up or not. In particular, the normally-closed switch element 106 can be a normally-closed relay.

Figure 4:
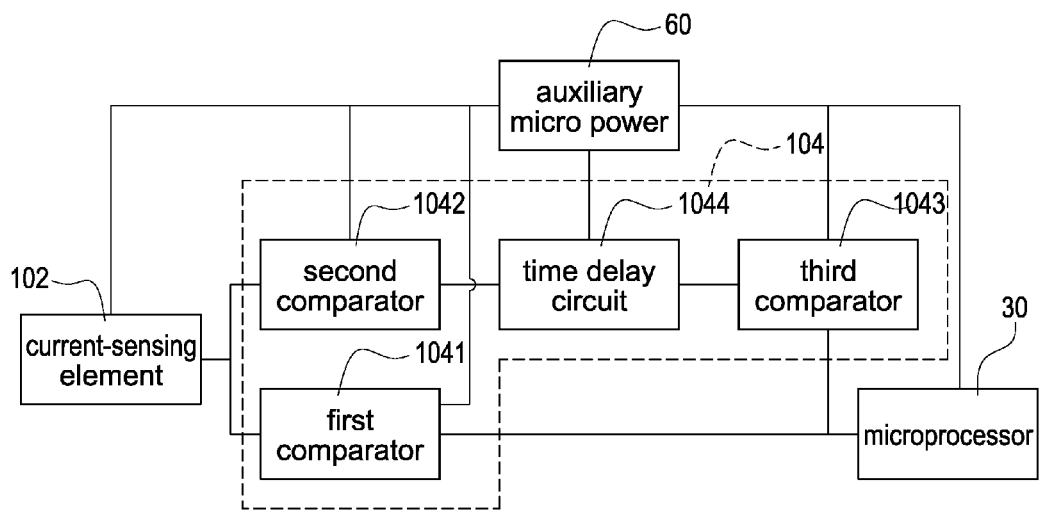
FIG. 4 is a partial circuit block diagram of an embodiment of the wake-up judgment apparatus for the generator according to the present disclosure.

Reference is made to FIG. 4 which is a partial circuit block diagram of an embodiment of the wake-up judgment apparatus for the generator according to the present disclosure. The electric charge processing element 104 mainly includes a first comparator 1041, a second comparator 1042, a third comparator 1043, and a time delay circuit 1044. The first comparator 1041 has a first terminal and a second terminal. The first terminal of the first comparator 1041 is electrically connected to the third terminal of the current-sensing element 102, and the second terminal of the first comparator 1041 is electrically connected to the microprocessor 30. The second comparator 1042 has a first terminal and a second terminal. The first terminal of the second comparator 1042 is electrically connected to the third terminal of the current-sensing element 102. The time delay circuit 1044 has a first terminal, a second terminal, and a third terminal. The first terminal of the time delay circuit 1044 is electrically connected to the second terminal of the second comparator 1042. The second terminal of the time delay circuit 1044 is electrically connected to the auxiliary micro power 60. The third comparator 1043 has a first terminal and a second terminal. The first terminal of the third comparator 1043 is electrically connected to the third terminal of the time delay circuit 1044. The second terminal of the third comparator 1043 is electrically connected to the microprocessor.

Figure 5:
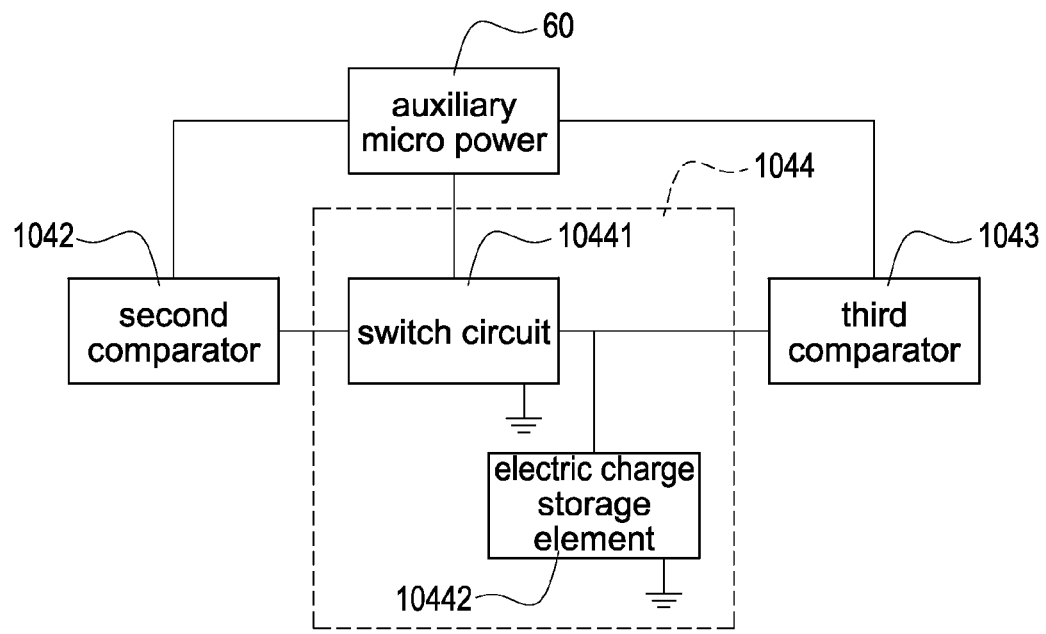
FIG. 5 is a partial circuit block diagram of another embodiment of the wake-up judgment apparatus for the generator according to the present disclosure.

Reference is made to FIG. 5 which is a partial circuit block diagram of another embodiment of the wake-up judgment apparatus for the generator according to the present disclosure. The time delay circuit 1044 includes a switch circuit 10441 and an electric charge storage element 10442. The switch circuit 10441 has a first terminal, a second terminal, a third terminal, and a fourth terminal. The first terminal of the switch circuit 10441 is electrically connected to the second terminal of the second comparator 1042, and the second terminal of the switch circuit 10441 is electrically connected to the first terminal of the third comparator 1043. The third terminal of the switch circuit 10441 is grounded, and the fourth terminal of the switch circuit 10441 is electrically connected to the auxiliary micro power 60. The electric charge storage element 10442 has a first terminal and a second terminal. The first terminal of the electric charge storage element 10442 is electrically connected to the second terminal of the switch circuit 10441, and the second terminal of the electric charge storage element 10442 is grounded.

Figure 6:
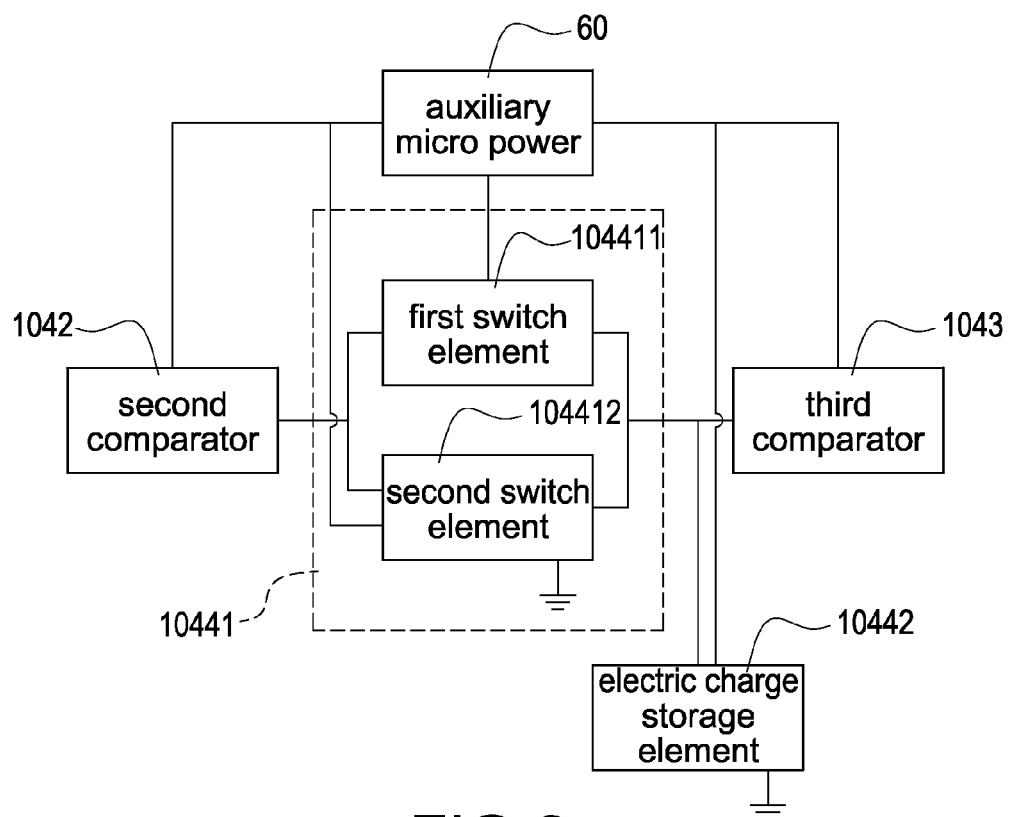
FIG. 6 is a partial circuit block diagram of further another embodiment of the wake-up judgment apparatus for the generator according to the present disclosure.

Reference is made to FIG. 6 which is a partial circuit block diagram of further another embodiment of the wake-up judgment apparatus for the generator according to the present disclosure. The switch circuit 10441 mainly includes a first switch element 104411 and a second switch element 104412. The first switch element 104411 has a first terminal, a second terminal, and a third terminal. The first terminal of the first switch element 104411 is electrically connected to the second terminal of the second comparator 1042, and the second terminal of the first switch element 104411 is electrically connected to the auxiliary micro power 60. The third terminal of the first switch element 104411 is electrically connected to the first terminal of the electric charge storage element 10442 and the first terminal of the third comparator 1043. The second switch element 104412 has a first terminal, a second terminal, and a third terminal. The first terminal of the second switch element 104412 is electrically connected to the second terminal of the second comparator 1042. The second terminal of the second switch element 104412 is electrically connected to the first terminal of the electric charge storage element 10442 and the first terminal of the third comparator 1043. The third terminal of the second switch element 104412 is grounded. In particular, the first switch element 104411 or the second switch element 104412 can be a transistor switch.

In conclusion, the present disclosure has following advantage. Because it is just to only use the auxiliary micro power 60 to implement the operation of waking up the microprocessor 30, the consumed power of operating the wake-up judgment apparatus 10 is much less than that of operating the conventional wake-up device, thus achieving energy-saving benefits.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A wake-up judgment apparatus installed between a generation apparatus and a microprocessor, the wake-up judgment apparatus configured to judge whether the microprocessor should be woken up or not according to operation conditions of the generation apparatus when the microprocessor is in a sleep state, the wake-up judgment apparatus comprising:
    a current-sensing element having a first terminal, a second terminal, and a third terminal, wherein the first terminal is electrically connected to the generation apparatus and a power conversion circuit, the second terminal is electrically connected to an auxiliary micro power, the current-sensing element is configured to detect a current output by the generation apparatus to the power conversion circuit, the power conversion circuit is configured to provide power conversion and power transmission between the generation apparatus and a load, and the power conversion circuit is electrically connected to a main supply power; and
    an electric charge processing element having a first terminal, a second terminal, and a third terminal, wherein the first terminal is electrically connected to the third terminal of the current-sensing element, the second terminal is electrically connected to the auxiliary micro power, the third terminal is electrically connected to the microprocessor, and the electric charge processing element is configured to output a wake-up signal to the microprocessor based on the current detected by the current-sensing element,
    wherein the microprocessor is electrically connected to the auxiliary micro power, and an output power of the auxiliary micro power is less than an output power of the main supply power.

2. The wake-up judgment apparatus in claim 1, wherein the output power of the auxiliary micro power is less than one tenth of the output power of the main supply power.

3. The wake-up judgment apparatus in claim 1, further comprising:
    a normally-closed element electrically connected to the power conversion circuit and the main supply power, and for a power flow from the generation apparatus to the load, a connection terminal to which the normally-closed switch element and the power conversion circuit are connected is closer to the load than a connection terminal to which the current-sensing element and the power conversion circuit are connected.

4. The wake-up judgment apparatus in claim 1, wherein the microprocessor is electrically connected to the power conversion circuit, the load, or the main supply power.

5. The wake-up judgment apparatus in claim 1, wherein the electric charge processing element comprises a first comparator having a first terminal and a second terminal; the first terminal is electrically connected to the third terminal of the current-sensing element, and the second terminal is electrically connected to the microprocessor.

6. The wake-up judgment apparatus in claim 1, wherein the electric charge processing element comprises:
    a second comparator having a first terminal and a second terminal; the first terminal is electrically connected to the third terminal of the current-sensing element;
    a time delay circuit having a first terminal, a second terminal, and a third terminal; the first terminal is electrically connected to the second terminal of the second comparator, and the second terminal is electrically connected to the auxiliary micro power; and
    a third comparator having a first terminal and a second terminal; the first terminal is electrically connected to the third terminal of the time delay circuit, and the second terminal is electrically connected to the microprocessor.

7. The wake-up judgment apparatus in claim 6, wherein the time delay circuit comprises:
    a switch circuit having a first terminal, a second terminal, a third terminal, and a fourth terminal; the first terminal is electrically connected to second terminal of the second comparator, the second terminal is electrically connected to the first terminal of the third comparator, the third terminal is grounded, and the fourth terminal is electrically connected to the auxiliary micro power; and
    an electric charge storage element having a first terminal and a second terminal; the first terminal is electrically connected to the second terminal of the switch circuit and the first terminal of the third comparator, and the second terminal is grounded.

8. The wake-up judgment apparatus in claim 7, wherein the switch circuit comprises:
    a first switch element having a first terminal, a second terminal, and a third terminal; the first terminal is electrically connected to the second terminal of the second comparator, the second terminal is electrically connected to the auxiliary micro power, and the third terminal is electrically connected to the first terminal of the electric charge storage element; and
    a second switch element having a first terminal, a second terminal, and a third terminal; the first terminal is electrically connected to the second terminal of the second comparator, the second terminal is electrically connected to the first terminal of the electric charge storage element, and the third terminal is grounded.

9. The wake-up judgment apparatus in claim 5, wherein the electric charge processing element comprises:
    a second comparator having a first terminal and a second terminal; the first terminal is electrically connected to the third terminal of the current-sensing element;
    a time delay circuit having a first terminal, a second terminal, and a third terminal; the first terminal is electrically connected to the second terminal of the second comparator, and the second terminal is electrically connected to the auxiliary micro power; and a third comparator having a first terminal and a second terminal; the first terminal is electrically connected to the third terminal of the time delay circuit, and the second terminal is electrically connected to the microprocessor.

10. The wake-up judgment apparatus in claim 9, wherein the time delay circuit comprises:
   a switch circuit having a first terminal, a second terminal, a third terminal, and a fourth terminal; the first terminal is electrically connected to second terminal of the second comparator, the second terminal is electrically connected to the first terminal of the third comparator, the third terminal is grounded, and the fourth terminal is electrically connected to the auxiliary micro power; and
   an electric charge storage element having a first terminal and a second terminal; the first terminal is electrically connected to the second terminal of the switch circuit and the first terminal of the third comparator, and the second terminal is grounded.

11. The wake-up judgment apparatus in claim 10, wherein the switch circuit comprises:
   a first switch element having a first terminal, a second terminal, and a third terminal; the first terminal is electrically connected to the second terminal of the second comparator, the second terminal is electrically connected to the auxiliary micro power, and the third terminal is electrically connected to the first terminal of the electric charge storage element; and
   a second switch element having a first terminal, a second terminal, and a third terminal; the first terminal is electrically connected to the second terminal of the second comparator, the second terminal is electrically connected to the first terminal of the electric charge storage element, and the third terminal is grounded.

12. A wake-up judgment apparatus installed between a generation apparatus and a microprocessor, the wake-up judgment apparatus configured to judge whether the microprocessor should be woken up or not according to operation conditions of the generation apparatus when the microprocessor is in a sleep state, the wake-up judgment apparatus comprising:
   a current-sensing element having a first terminal, a second terminal, and a third terminal, wherein the first terminal is electrically connected to the generation apparatus and a power conversion circuit, the second terminal is electrically connected to an auxiliary micro power, the current-sensing element is configured to detect a current output by the generation apparatus to the power conversion circuit, the power conversion circuit is configured to provide power conversion and power transmission between the generation apparatus and an air conditioning device, and the power conversion circuit is electrically connected to a main supply power; and
   an electric charge processing element having a first terminal, a second terminal, and a third terminal, wherein the first terminal is electrically connected to the third terminal of the current-sensing element, the second terminal electrically connected to the auxiliary micro power, the third terminal is electrically connected to the microprocessor, and the electric charge processing element is configured to output a wake-up signal to the microprocessor based on the current detected by the current-sensing element,
   wherein the microprocessor is electrically connected to the auxiliary micro power, and an output power of the auxiliary micro power is less than an output power of the main supply power.

13. The wake-up judgment apparatus in claim 12, wherein the output power of the auxiliary micro power is less than one tenth of the output power of the main supply power.

14. The wake-up judgment apparatus in claim 12, further comprising:
   a normally-closed element electrically connected to the power conversion circuit and the main supply power, and for a power flow from the generation apparatus to the air conditioning device, a connection terminal to which the normally-closed switch element and the power conversion circuit are connected is closer to the air conditioning device than a connection terminal to which the current-sensing element and the power conversion circuit are connected.

15. The wake-up judgment apparatus in claim 12, wherein the microprocessor is electrically connected to the power conversion circuit, the air conditioning device, or the main supply power; and the electric charge processing element comprises a first comparator having a first terminal and a second terminal; the first terminal is electrically connected to the third terminal of the current-sensing element, and the second terminal is electrically connected to the microprocessor.

16. The wake-up judgment apparatus in claim 12, wherein the electric charge processing element comprises:
   a second comparator having a first terminal and a second terminal; the first terminal is electrically connected to the third terminal of the current-sensing element;
   a time delay circuit having a first terminal, a second terminal, and a third terminal; the first terminal is electrically connected to the second terminal of the second comparator, and the second terminal is electrically connected to the auxiliary micro power; and
   a third comparator having a first terminal and a second terminal; the first terminal is electrically connected to the third terminal of the time delay circuit, and the second terminal is electrically connected to the microprocessor.

17. The wake-up judgment apparatus in claim 16, wherein the time delay circuit comprises:
   a switch circuit having a first terminal, a second terminal, a third terminal, and a fourth terminal; the first terminal is electrically connected to second terminal of the second comparator, the second terminal is electrically connected to the first terminal of the third comparator, the third terminal is grounded, and the fourth terminal is electrically connected to the auxiliary micro power; and
   an electric charge storage element having a first terminal and a second terminal; the first terminal is electrically connected to the second terminal of the switch circuit and the first terminal of the third comparator, and the second terminal is grounded.

18. The wake-up judgment apparatus in claim 17, wherein the switch circuit comprises:
   a first switch element having a first terminal, a second terminal, and a third terminal; the first terminal is electrically connected to the second terminal of the second comparator, the second terminal is electrically connected to the auxiliary micro power, and the third terminal is electrically connected to the first terminal of the electric charge storage element; and a second switch element having a first terminal, a second terminal, and a third terminal; the first terminal is electrically connected to the second terminal of the second comparator, the second terminal is electrically connected to the first terminal of the electric charge storage element, and the third terminal is grounded.

19. The wake-up judgment apparatus in claim 14, wherein the electric charge processing element comprises:
   a second comparator having a first terminal and a second terminal; the first terminal is electrically connected to the third terminal of the current-sensing element;
   a time delay circuit having a first terminal, a second terminal, and a third terminal; the first terminal is electrically connected to the second terminal of the second comparator, and the second terminal is electrically connected to the auxiliary micro power; and
   a third comparator having a first terminal and a second terminal; the first terminal is electrically connected to the third terminal of the time delay circuit, and the second terminal is electrically connected to the microprocessor.

20. The wake-up judgment apparatus in claim 19, wherein the time delay circuit comprises:
   a switch circuit having a first terminal, a second terminal, a third terminal, and a fourth terminal; the first terminal is electrically connected to second terminal of the second comparator, the second terminal is electrically connected to the first terminal of the third comparator, the third terminal is grounded, and the fourth terminal is electrically connected to the auxiliary micro power; wherein the switch circuit comprises:
      a first switch element having a first terminal, a second terminal, and a third terminal; the first terminal is electrically connected to the second terminal of the second comparator, the second terminal is electrically connected to the auxiliary micro power, and the third terminal is electrically connected to the first terminal of the electric charge storage element; and
      a second switch element having a first terminal, a second terminal, and a third terminal; the first terminal is electrically connected to the second terminal of the second comparator, the second terminal is electrically connected to the first terminal of the electric charge storage element, and the third terminal is grounded; and
   an electric charge storage element having a first terminal and a second terminal; the first terminal is electrically connected to the second terminal of the switch circuit and the first terminal of the third comparator, and the second terminal is grounded.

* * * * *